United States Patent [19]
Ono et al.

[11] Patent Number: 4,624,138
[45] Date of Patent: Nov. 25, 1986

[54] GAS FLOW SENSOR AND METHOD OF PRODUCING A GAS FLOW SENSOR

[75] Inventors: Hirofumi Ono; Kiyoharu Tsujimura; Masayuki Kamo; Yoritaka Isoda, all of Kyoto, Japan

[73] Assignee: Stec, Inc., Kyoto, Japan

[21] Appl. No.: 620,074

[22] Filed: Jun. 12, 1984

[30] Foreign Application Priority Data

Jul. 4, 1983 [JP] Japan .................................. 58-122196

[51] Int. Cl.⁴ .............................................. G01F 1/68
[52] U.S. Cl. ........................................ 73/204; 29/620
[58] Field of Search .................... 73/204; 29/610, 620; 156/647, 657, 662; 427/101, 102, 103; 338/25, 308

[56] References Cited

U.S. PATENT DOCUMENTS

| | | | |
|---|---|---|---|
| 3,938,384 | 2/1976 | Blair | 73/204 |
| 3,995,481 | 12/1976 | Djorup | 73/204 X |
| 4,129,848 | 12/1978 | Frank | 338/308 |
| 4,144,316 | 3/1979 | Aine | 338/2 |
| 4,320,655 | 3/1982 | Kammermaier et al. | 73/204 |
| 4,343,768 | 8/1982 | Kimura | 73/204 X |
| 4,471,647 | 9/1984 | Jerman | 374/135 X |
| 4,478,077 | 10/1984 | Bohrer et al. | 73/204 |

FOREIGN PATENT DOCUMENTS

6805314 10/1968 Netherlands .................... 73/204

*Primary Examiner*—Herbert Goldstein
*Attorney, Agent, or Firm*—Wenderoth, Lind & Ponack

[57] ABSTRACT

A mass gas flow sensor for measuring the mass flow rate of a gas through a passage, and a method of manufacture thereof. The sensor includes a substrate having a streamlined end surface which is to project upstream in the passage, upstream and downstream heating resistors formed on the substrate, protective films covering the resistors, and circuitry for applying current to the resistors so as to heat the resistors, the gas cooling the upstream resistor more than the downstream resistor. The circuitry also produces an electrical voltage responsive to differences in voltage across the upstream and downstream resistors, corresponding to the mass gas flow in the passage. In a mass production method of manufacture of a preferred embodiment, a composite substrate material is produced with hollow portions therein by joining a first integral wafer having a plurality of grooves with a second integral wafer which closes the grooves, and providing a plurality of resistors on the composite substrate material by photolithography and etching directly over the grooves before cutting the substrate material into a plurality of hollow substrates. One end surface of each of the hollow substrates is then tapered to provide a streamlined shape.

4 Claims, 13 Drawing Figures

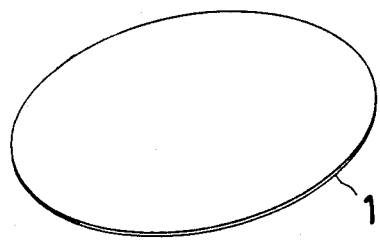
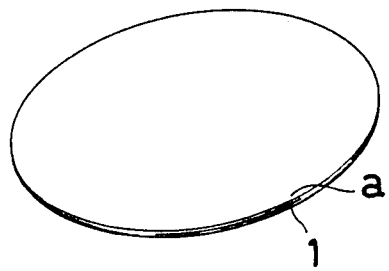
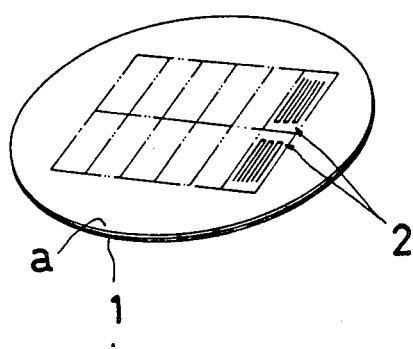
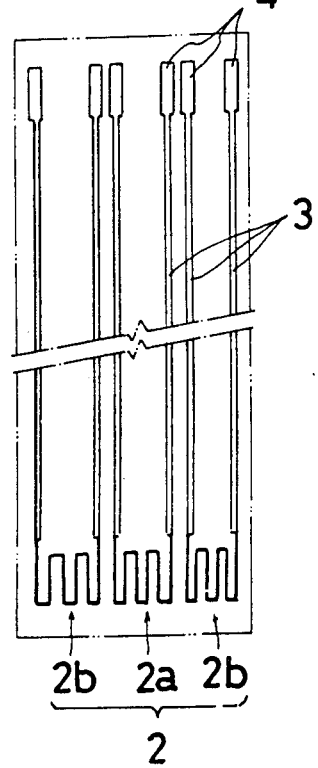
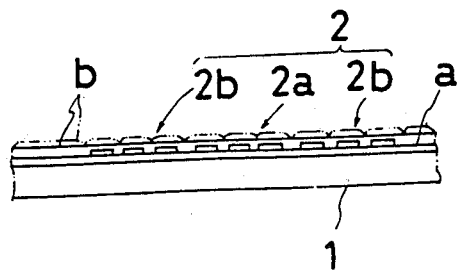

GAS FLOW SENSOR AND METHOD OF PRODUCING A GAS FLOW SENSOR

BACKGROUND OF THE INVENTION

1. Field of the Invention

The present invention relates to a gas flow sensor which includes resistors on a substrate member, which develop voltages thereacross in correspondence to the mass of gas to be measured on the basis of the differences in electric resistance resulting from the differences in temperature produced by the transfer of heat by said gas to be measured passing through a passage of said gas to be measured as a heat transfer medium to which heat energy is given, and a method of manufacturing same.

2. Description of the Prior Art

The above described gas flow sensor aims at the measurement of a mass flow rate (hereinafter "flow rate") of a gas to be measured passing through a passage and is used for example in an automatic air-to-fuel ratio control system installed in a passage of a combustion air for an engine for measuring the quantity of combustion air passing through said passage and simultaneously feeding the desired quantity of fuel in a cylinder of an engine on the basis of the measured quantity of a combustion air.

Although there are two types of the above described gas flow sensor: a self-heating type one, in which two heating resistors are arranged with an interval therebetween in the direction of gas flow, and an auxiliary heating type one, in which one heating resistor and two heat sensitive resistors respectively upstream and downstream of said heating resistor in the direction of gas flow are arranged with intervals therebetween. In every case, the resistors are connected with a bridge circuit.

In the former self-heating type sensor, heat energy is given to a gas to be measured from a heating resistor at an upstream side of the sensor in the passage and said gas to be measured flowing in the passage is used as a heat transfer medium for transporting the heat energy to a heating resistor at the downstream side of the sensor. A bridge circuit is electrified to heat said heating resistors, and said gas to be measured is passed through said passage. As a result, the electric resistance of the upstream heating resistor is reduced while the electric resistance of the downstream heating resistor is increased to break the equilibrium in said bridge circuit and the voltage is developed in correspondence to the flow rate of said gas on the basis of a difference in electric resistances. On the other hand, in the latter auxiliary heating type sensor, both heat sensitive resistors are only slightly electrified and a heating resistor is heated by electrifying it, whereby transferring heat energy of the downstream heating resistor to said heat-sensitive resistor. The voltage is developed in correspondence to the flow rate of a gas to be measured on the basis of the difference in electric resistances of between the heat sensitive resistors owing to the above described transfer of heat.

Such a flow sensor has been widely used in the semiconductor industry, the automotive industry, the analytical instrument industry and industry in general as a sensor for use in a mass flow meter for accurately measuring the mass flow rate of fluid and a sensor for use in a mass flow controller for accurately controlling the mass flow rate in addition to a sensor for use in an automatic control of an air-to-fuel ratio. Since the accurate measurement and control of the flow rate of gases used as the raw materials in the manufacture of semi-conductors have a serious influence upon the quality and yield of the resulting semi-conductors, such a flow sensor has been used in the semi-conductor manufacturing apparatus in great quantities. Furthermore, also in the fields where such a sensor has not been used, there has been an increase in the use of mass flow controllers.

Although the provision of an inexpensive and uniform in characteristics gas flow sensor is desired, the above described desire has not been satisfied for the present.

That is to say, although a hot wire type gas flow sensor has been frequently used for a gas flow sensor for use in controlling air-to-fuel ratio and it has been manufactured by winding a resistor made of platinum wire around a sensor substrate, there are limits to the automatization of the operation of winding platinum wires around each sensor substrate and the manufacture of a gas flow sensor cannot but be dependent upon manual operations. As a result, the product cost is increased since the productivity is low and it is difficult to massproduce uniform in characteristics products.

In addition, the stream of gas is apt to be disordered causing a reduction in the accuracy of measurement since the column-like structure of the sensor is inserted into the stream of gas.

SUMMARY OF THE INVENTION

It is an object of the present first invention to provide an effectively usable gas flow sensor which has uniform characteristics and can achieve highly accurate measurements.

It is an object of the present second invention to provide a method of mass producing gas flow sensors to put inexpensive gas flow sensors on the market.

BRIEF DESCRIPTION OF THE DRAWINGS

The drawings illustrate the preferred embodiments of the present invention, in which FIGS. 1(a) to 1(e) are schematic drawings showing the production procedure of a gas flow sensor, FIG. 2 being a whole plan view showing a gas flow sensor before it is cut and separated as a gas flow sensor, FIG. 3 being a sectional and schematic view showing a gas flow sensor, FIGS. 4 and 5 being diagrams showing examples of using a gas flow sensor, FIGS. 6, 7 and 9 being sectional views showing other preferred embodiments of a gas flow sensor according to the present invention, and FIG. 8 being a perspective view showing a sensor substrate used for the production of a gas flow sensor.

DESCRIPTION OF THE PREFERRED EMBODIMENTS

The production procedure of a gas flow sensor according to the present invention will be described below. (i) At first, as shown in FIG. 1(a), a sensor substrate (1), which is called a crystalline silicon wafer, is prepared by slicing a silicon ingot. (ii) Then, as shown in FIG. 1(b), an insulating film (a) of inorganic substances such as that of silicon dioxide, which is formed by an oxidizing method and a sputtering method, and that of silicon tetranitride, which is formed by a plasma CVD (Chemical Vapor Deposition) method, is formed on one side surface of said sensor substrate (1).

It is desirable that said side surface of said sensor substrate (1) is subjected to polishing prior to the formation of said insulating film (a).

That is to say, since a silicon wafer formed by slicing a silicon ingot has an affected layer of 30 to 60μ deep on the sliced surface thereof and consequently there is the possibility that an insulating film (a) formed on said sliced surface may come off, it is desirable that said insulating film (a) is surely formed by applying a mechanical polishing such as lapping and polishing, or a chemical polishing using chemical solutions such as alkali together with said mechanical polishing to said affected layer. (iii) Subsequently, as shown in FIG. 1(c) showing an auxiliary heating type sensor, a plurality of pairs of resistors (2) are formed at the appointed positions on said insulating film (a). Resistor (2) consists of one heating resistor (2a) and two heat sensitive resistors (2b) spaced an appointed interval to opposite sides of said heating resistor (2a). For example, nickel-chromium film of the appointed size as said heating resistor and for example nickel film of the appointed size as the heat sensitive resistors are formed by a sputtering method or the like at the appointed positions on said insulating film (a) and a photoresist is applied to said film.

Then a mask with the appointed resistor pattern is placed on said photoresist. An etching pattern is formed on said photoresist by exposing and developing.

Subsequently, a resistor film is etched by means of an ion beam miling apparatus and the like to form a resistor pattern of the appointed shape. Then said photoresist is removed by the use of the ion beam etching method, solvents or the like to form said heating resistor (2a) and said heat sensitive resistors (2b) having the appointed pattern as shown in the enlarged FIG. 1(e).

Heating resistor (2a) and heat sensitive resistors (2b) may be formed separately.

Figure 2:
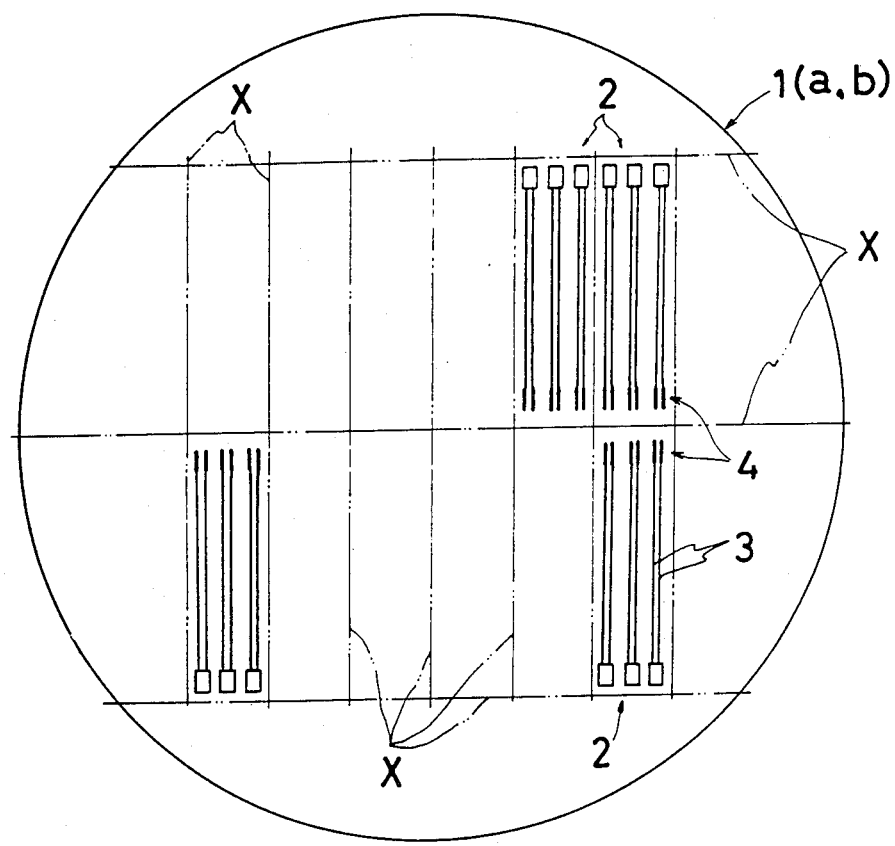
Figure 3:
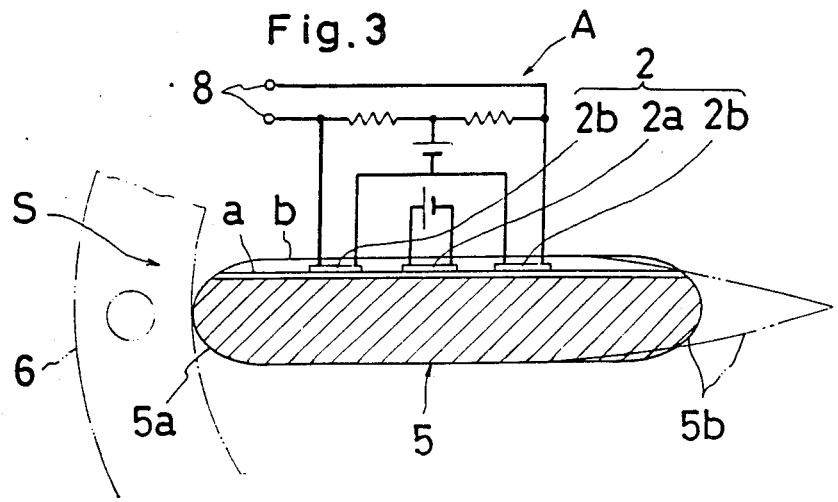

In addition, referring to FIG. 1(e), reference numeral (3) designates a lead and reference numeral (4) designates a bonding pad, both thereof being made of for example gold. (iv) Then, as shown in FIG. 1(d), a protective film (b) of inorganic substances such as silicon dioxide, which is formed by a sputtering method, and silicon tetranitride, which is formed by a plasma CVD method, is formed on the upper surface of said resistors (2) and said lead (3) excepting said bonding pad (4) and the upper surface of said protective film (b) is polished in the same manner as in the polishing of said insulating film (a). (v) Subsequently, as shown in FIG. 2, said sensor substrate (1) is cut along the appointed cutting line to divide said sensor substrate into a plurality of sensor substrate members (5). (vi) Then, as shown in FIG. 3, both end surface portions (5a) of each sensor substrate member (5) are worked into a streamlined shape to produce a plurality of auxiliary heating type gas flow sensors (S) from one sensor substrate (1). If necessary, a flange (6) may be mounted on said gas flow sensors (S).

Figure 4:
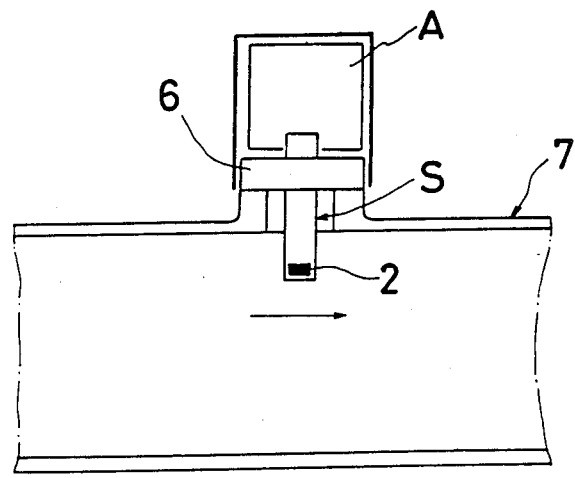

Referring now to FIG. 4 showing an example of using such a gas flow sensor (S), said resistor (2) is installed in a passage (7) through which is to flow the gas to be measured, so that said heating resistor (2a) and said heat sensitive resistors (2b) may be arranged along the direction of gas flow (the direction shown by an arrow in FIG. 4) to measure a mass flow rate of said gas. An electric circuit (A) for said gas flow sensor (S) is shown in FIG. 3. Said heat sensitive resistors (2b) are only slightly electrified while said heating resistor (2a) is electrified. The gas to be measured passing through the passage (7) is heated by said heating resistor (2a). The heat of the downstream gas to be measured is transmitted to said heat sensitive resistor (2b). As a result, a difference is produced between values of resistance of the two heat sensitive resistors (2b) to break an equilibrium of a bridge circuit for both heat sensitive resistor (2b) and a voltage, which is in correspondence to a mass flow rate of said gas to be measured, is produced across terminals (8).

Figure 5:
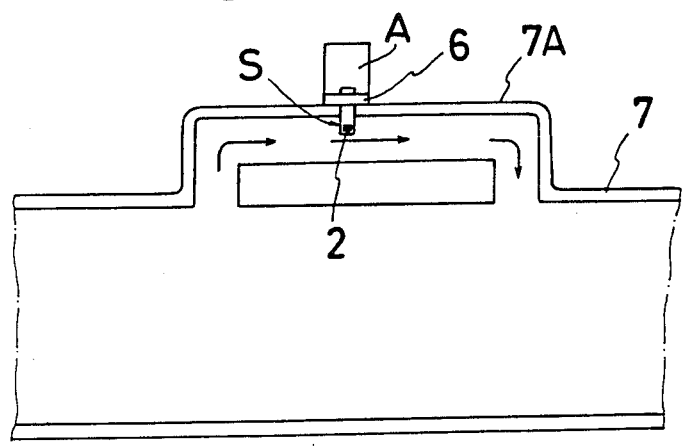

Although there are not any problems if a gas to be measured is clean in the above described measurement, dust, oil mists and the like are often adhered to said sensor (S) on account of back-fire from an engine, for example, in the case when said gas to be measured is air to be fed into an engine. In such a case, as shown in FIG. 5, it is desired that a bypass passage (7A) is connected with the main passage (7) and said sensor (S) is installed in said bypass passage (7A).

Figure 6:
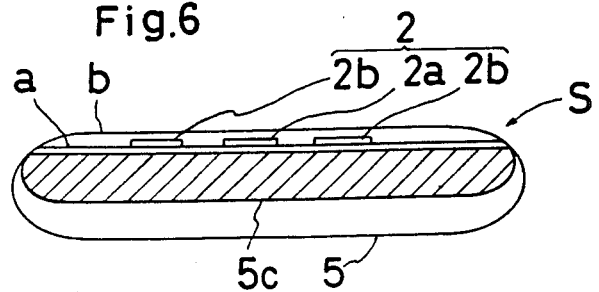

Referring to FIG. 6 showing another preferred embodiment of said gas flow sensor (S), it is characterized in that only the parts (5c) of said sensor substrate member (5) corresponding to said resistor (2) are thin. That is to say, although it is the best means for achieving the prompt response that said resistor (2) is directly exposed to said gas to be measured, it is necessary that the thickness of said substrate member (5) is reduced to reduce the heat capacity thereof in order to still further increase the response speed. However, the reduction of the thickness of the whole substrate member (5) is limited in respect of strength. Accordingly, the heat capacity is reduced while keeping the necessary strength of the whole substrate member (5) by making only the parts (5c) thereof corresponding to said resistor (2) thin.

Figure 7:
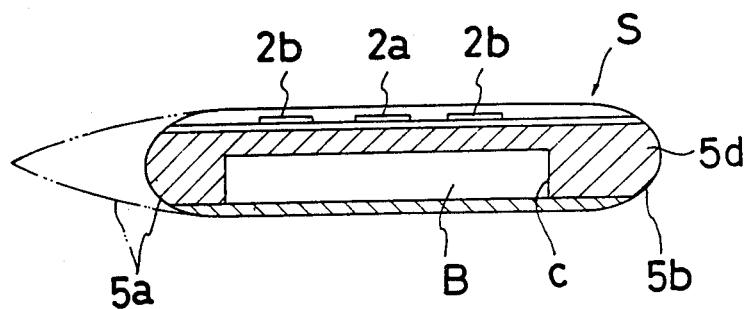
Figure 8:
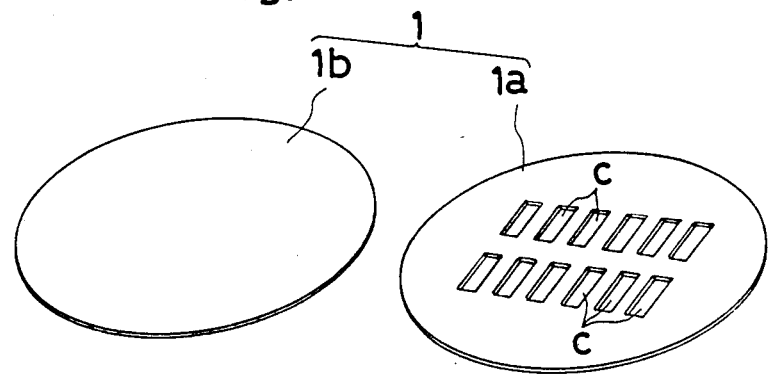

Referring to FIG. 7 showing still another gas flow sensor (S), said sensor substrate member (5) is provided with a hollow portion (B) of at least the part (5d) corresponding to said resistor (2) to reduce the heat capacity thereof while keeping a high strength of said sensor substrate member (5) itself. As shown in for example FIG. 8, said sensor substrate (1) is formed by joining a crystalline silicon wafer (1a), which is provided with a plurality of grooves (c) of almost identical size on one side thereof, with a crystalline silicon wafer (1b) for closing said grooves (c). Then said gas flow sensor (S) of hollow structure is produced by carrying out the above described procedures (ii) to (vi) under the condition that said resistor (2) is arranged in correspondence to said hollow portion (B) defined by said grooves (c), the resistors (2) being provided on the side of wafer (1a) opposite the side provided with grooves (c).

Figure 9:
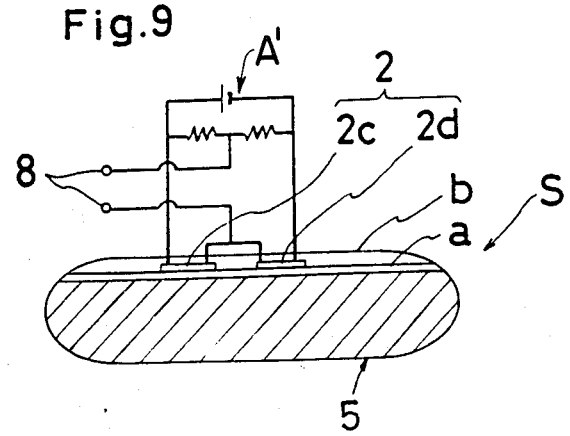

Referring to FIG. 9 showing said self-heating type gas flow sensor (S), said resistor (2) consists of a pair of heating and heat sensitive resistors (2c) and (2d) having a heating function and a heat sensitive function. Also, an electric circuit (A') for said resistor (2) is shown in FIG. 9. That is to say, both resistors (2c) and (2d) are electrified to heat them. The heat is transferred from the upstream resistor (2c) to the downstream resistor (2d) to develop a voltage which depends upon the mass flow rate of said gas to be measured at terminals (8) in the same manner as in the above described auxiliary heating type gas flow sensor when said gas to be measured is passed through said passage (7).

In addition, it is necessary only that both end surface portions (5a) and (5b) of said sensor substrate member (5) have such a form that the stream of said gas to be measured passing over said resistor (2) is not disturbed.

For example, as shown by phantom line in FIG. 3, the downstream end surface portion (5b) may be tapered, or, on the contrary, as shown in FIG. 7, the upstream end surface portion (5a) may be tapered. The shape of the downstream end surface portion (5b) is out of the question so far as the stream of said gas to be measured passing over said resistor (2) is not disturbed even though an eddy is produced at the downstream end surface portion (5b).

As described above, the first invention relates to a gas flow sensor formed by placing resistors, which develop a voltage thereacross corresponding to a mass flow rate of a gas to be measured, on a sensor substrate member, characterized by that said resistors are formed in film-like shape on said sensor substrate member by photolithography and etching, a protective film being formed on the upper surface of said resistors to detect the flow rate of said gas to be measured therethrough, and at least the end surface portion of the up stream side of said sensor substrate member being formed in such a shape that the disturbance of said gas to be measured can be suppressed when said sensor substrate member is inserted into the passage through which the gas to be measured passes.

That is to say, since said resistors are formed on a sensor substrate member by photolithography and etching, the reproducibility of a resistance of said resistors is remarkably good. In other words, a gas flow sensor having uniform characteristics can be obtained and the productivity thereof can be increased since the production thereof is easily automatized.

Since said resistors are covered with a protective film, the breakage of said resistors owing to the contact thereof with other articles is decreased. In addition, the upstream shape of the end surface portion of the sensor substrate member leads to an effective suppression of the disturbance of the stream of said gas to be measured passing over the sensor substrate thereby improving the accuracy of measurement.

The second invention relates to a method of producing a gas flow sensor, characterized in that a plurality of resistors are formed in film-like shape on one side surface of a sensor substrate, which is cut to form sensor substrate members, at the positions corresponding to said sensor substrate members by photolithography and etching, said resistors being covered with a protective film, said sensor substrates being separately cut, and at least the end surface portion of the upstream side of sensor substrate member when inserted into the passage through which said gas to be measured, being formed in such a shape that the disturbance of the stream of said gas to be measured can be suppressed to produce a plurality of gas flow sensors.

According to the above described method, a plurality of gas flow sensors having the above described excellent functions can be obtained at a stroke. This was impossible until resistors are formed on one side surface of a sensor substrate by photolithography and etching thereby providing the capability of mass-producing gas flow sensors. As a result, the remarkable cost reduction of gas flow sensors can be achieved.

We claim:

1. A gas flowsensor for being disposed in a passage through which a gas is to flow in a predetermined direction, said sensor comprising:
   a crystaline silicon substrate having a hollow portion and having an upstream end surface of streamlined shape so as suppress perturbations of the flow of gas in the passage, said substrate including a first crystalline silicon wafer having a first side and a second side opposite said first side and a second crystaline silicon wafer mated to said second side of said first wafer said hollow portion being located between said first and second wafers;
   an upstream self-heating type resistor whose resistance increase with increasing temperature thereof, formed on said first side by said first wafer in a film by photolithography and etching directly over said hollow portion;
   a downstream self-heating type resistor whose resistance increases with increasing temperature thereof, formed on said first side of said first wafer in a film by photolithography and etching, spaced downstream from said upstream heating resistor directly over said hollow portion;
   protective films covering said upstream resistor and said downstream resistor so as to be exposed to the gas flowing through the passage when said sensor is disposed in said passage;
   means for simultaneously applying an electrical current through said upstream resistor and said downstream resistor so as to heat said upstream resistor and said downstream resistor, whereby heat is provided from said upstream resistor and from said downstream resistor to the gas flowing through the passage in amounts proportional to the mass flow rate of the gas and inversely proportional to the temperature of the gas at the respective upstream and downstream resistors, the gas cooling said upstream resistor more that said downstream resistor, when said sensor is disposed in the passage; and
   means responsive to differences in voltage across said upstream resistor and said downstream resistor resulting from differences in temperature thereof produced by differential cooling thereof by the gas, for producing an electrical voltage corresponding to the mass gas flow in the passage.

2. A sensor as in claim 1, wherein said first wafer has a groove in said second side thereof, and said second wafer is joined to said first wafer so as to close said groove, said groove defining said hollow portion, said upstream and downstream resistors being formed on a surface of said first integral member opposite said one side.

3. A sensor as in claim 1, wherein said electrical voltage producing means comprises a bridge circuit connected across said upstream resistor and said downstream resistor.

4. In a method of forming gas flowsensors each having resistors and means for measuring gas flow on the basis of differences in electrical resistance of the resistors resulting from differences in temperature thereof produced by transfer of heat between the gas and the resistors, to be disposed in a passage through which the gas to be measured is to flow in a predetermined direction, the improvement wherein the method includes the steps of:
   joining an inner surface of a first integral crystaline silicon wafer member having opposite inner and outer side surfaces to an inner surface of a second integral crystaline silicon wafer member having opposite inner and outer side surfaces and a plurality of spaced apart grooves in the inner surface thereof opening into the inner side surfaces thereof, to define a composite substrate material, such that the first integral member closes the grooves in the second integral member to define respective hollow portions of the composite substrate material;

providing a plurality of spaced apart film-like resistors on the outer surface of one of the first and second integral members by photolithography and etching directly over the grooves;

after said providing step, covering the plurality of resistors with a protective film;

after said covering step, cutting the substrate material into a plurality of hollow substrates, each having at least two of the resistors thereon and one of the grooves therein;

forming each hollow substrate with an upstream end surface of streamlined shape so as to suppress perturbations of the flow gas across the substrate in the passage; and for each hollow substrate having resistors thereon, providing means for measuring the mass gas flow on the basis of differences in electrical resistance of the resistors thereon resulting from differences in temperature thereof produced by transfer of heat between the gas and the resistors.

* * * * *